United States Patent [19]

Kaut, Jr.

[11] 4,030,778
[45] June 21, 1977

[54] LEAKPROOF COUPLING MEANS FOR GARDEN HOSES AND THE LIKE

[76] Inventor: William Kaut, Jr., 12 Alden Lane, Creve Coeur, Mo. 63141

[22] Filed: May 19, 1975

[21] Appl. No.: 578,473

[52] U.S. Cl. .................................. 285/174; 285/8; 285/257; 285/354
[51] Int. Cl.² ..................................... F16L 33/20
[58] Field of Search .......... 285/109, 174, 257, 354, 285/8, 238, 372

[56] References Cited
UNITED STATES PATENTS

| | | | |
|---|---|---|---|
| 515,925 | 3/1894 | Ricketts | 285/238 |
| 659,071 | 10/1900 | Joseph et al. | 285/109 |
| 943,900 | 12/1909 | Smith | 285/109 X |
| 1,138,282 | 5/1915 | Dodge | 285/174 |
| 1,149,491 | 8/1915 | Barrie et al. | 285/109 |
| 1,230,854 | 6/1917 | Breuer | 285/174 |
| 1,426,724 | 8/1922 | Fyffe | 285/354 X |
| 2,278,479 | 4/1942 | Parker | 285/354 X |
| 2,420,778 | 5/1947 | Herold | 285/354 X |
| 2,421,974 | 6/1947 | Vandervoort | 285/109 |
| 2,481,730 | 9/1949 | Doerr | 285/257 X |
| 2,787,480 | 4/1957 | Staller | 285/238 |

FOREIGN PATENTS OR APPLICATIONS

| | | | |
|---|---|---|---|
| 670,887 | 8/1929 | France | 285/372 |
| 2,006,115 | 8/1970 | Germany | 285/174 |

*Primary Examiner*—Thomas F. Callaghan
*Attorney, Agent, or Firm*—Charles B. Haverstock

[57] ABSTRACT

A leakproof coupling means for use in connecting garden hoses and other conduit members which have cooperatively engageable male and female coupling members each having an end surface and each having a shoulder formed therein at a location spaced from the respective end surfaces, and a resilient tubular member of a size and shape to fit into the male coupling member, the resilient tubular member having spaced opposite end surfaces adapted to simultaneously sealably engage the respective shoulders formed in the male and female members when the members are coupled together. The present coupling means can be used between connected sections of garden hose and the like and can also be used between a garden hose and a faucet or tap connection therefor. The present device can also be modified to have the hose extend through and beyond one end of one of the coupling members for engagement with means on the other coupling members when the coupling members are connected together.

7 Claims, 7 Drawing Figures

U.S. Patent  June 21, 1977  4,030,778
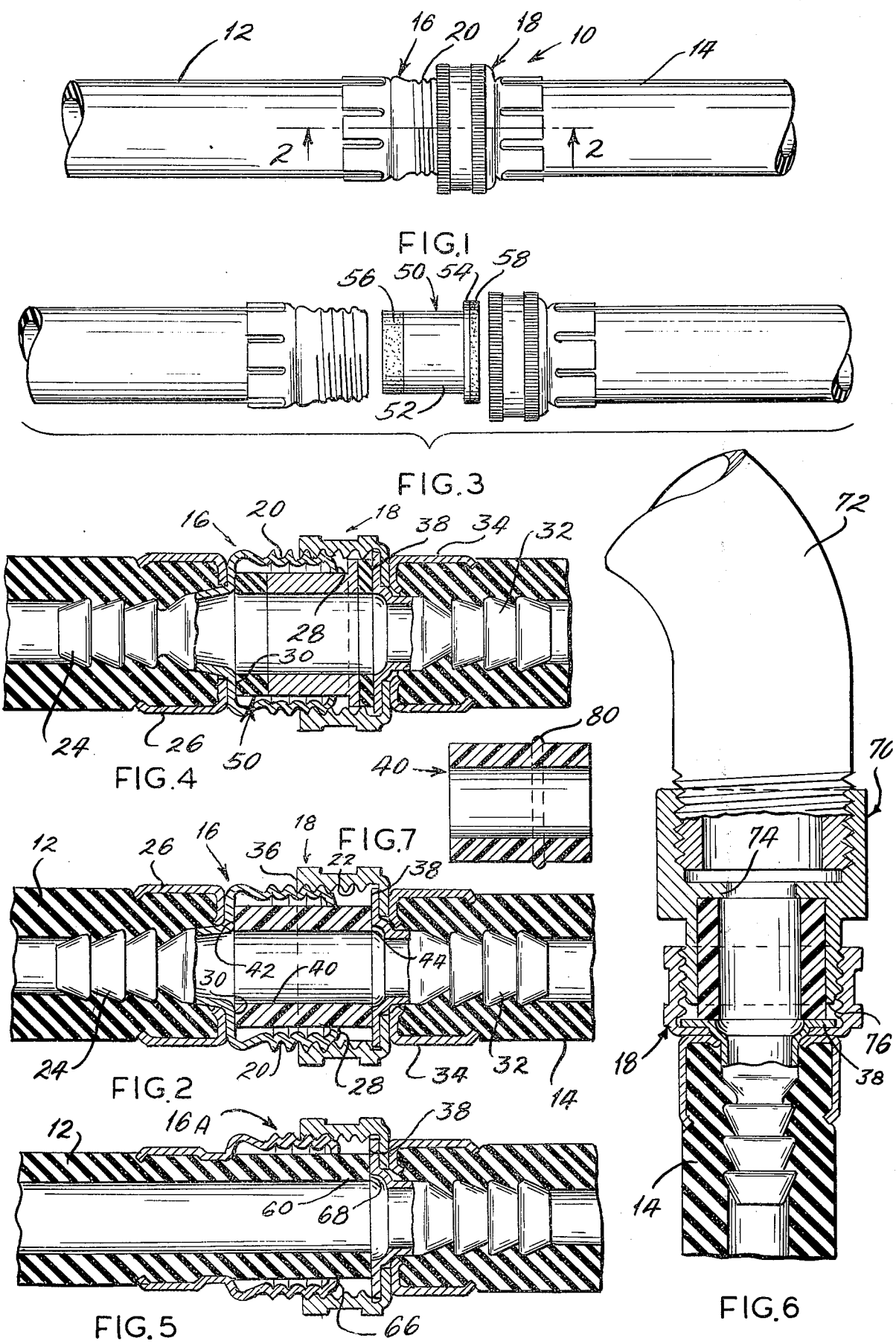

LEAKPROOF COUPLING MEANS FOR GARDEN HOSES AND THE LIKE

BACKGROUND OF THE INVENTION

Gardeners and others who use hoses for various purposes have been annoyed and inconvenienced by the leakage problem which is so common with conventional couplings used to join sections of hoses and the like. One of the main disadvantages of existing couplings has been due to the fact that they are relatively thin, flat, annular washers which are usually positioned in the female coupling member and compressed by the end of the male member when the members are connected together. The known washers have been made of a rubber or rubber-like material which is compressed under pressure to form a seal between the coupling members. After relatively few uses, such washers lose their elasticity and become compacted, hard and brittle, and it soon becomes necessary to use a tool such as a wrench or a pair of pliers on the coupling members to compress the washers sufficiently to prevent leakage, and even this doesn't always work. This is highly undesirable, and many people simply put up with a certain amount of leakage until the washer is so deteriorated that it must be replaced. The replacement of the known washers has also been a source of irritation, since as the washers flatten and lose their resiliency they also tend to enlarge in diameter within the female member, becoming lodged therein, and are difficult to remove. More often than not, it is necessary to use a tool such as a screwdriver or a knife to chip out the old washer before a new one can be installed.

All of these and other disadvantages of known coupling constructions are well known and documented, and all are overcome by the present construction which teaches the construction and use of an improved coupling means, including as a portion thereof, an improved and longer lasting resilient tubular member which is easy to install and remove, does not become compacted, hard and brittle, and can be repeatedly used without substantially diminishing its sealing action and without requiring any special tools for tightening the coupling members. Furthermore, the resilient member used in the subject coupling means normally extends beyond the free end of one of the coupling members when installed, so that it helps to prevent damage to that member when the member is dropped or bumped against something, and the resilient member can be made to fit snugly into one of the coupling members so that it will not easily come out and be lost.

The substantially greater length of the resilient tubular member used in the present construction results in many important advantages over conventional constructions. For example, such greater length increases the resilient memory of the tubular member over that of shorter members or washers. Also because of its greater length, the present tubular member proves easier to remove and install, and requires less tightening force be applied to produce a sealed condition, thereby extending the life of the members as compared to known devices. Furthermore, the portions of the subject coupling means against which opposite ends of the resilient member abut are located on opposite sides of the cooperating threaded portions used on the coupling means, and the resilient member therefore serves to protect the threaded portions from water while improving the seal. Therefore, the present coupling means are less likely to leak due to having a resilient member located adjacent to the place in the coupling means where the threaded portions of the coupling members are engaged.

The two most pertinent prior art constructions known are U.S. Pat. Nos. 3,596,931 and 3,108,826. U.S. Pat. No. 3,596,931 discloses a construction wherein a seal is formed by compressing deformable peripheral flange members between terminal ends of pipe sections. The means disclosed in this patent require the use of more members than the present construction, and the members used are more costly and complicated. Further, while the patented construction utilizes specially constructed parts, the present construction can be made using conventional products modified only slightly, and this is an important advantage thereover. Still further, the patented construction could not easily be applied for effecting the seal between male and female coupling members.

The construction shown in U.S. Pat. No. 3,108,826 includes means for effecting a seal between two mating coupling components, but it accomplishes the seal by providing a deformable sleeve member which, after being compressed by the cooperative engagement of the threaded surfaces on the respective members, resiliently expands in a radial direction against the threaded portions of the mating members to insure their continued cooperation. The present construction, by contrast, effects its seal by the axial compression of its tubular member by at least one flange located within one of the coupling members.

It is therefore a principal object of the present invention to provide improved and more leakproof means for sealing between conduit members which are coupled together.

Another object is to provide a relatively inexpensive simple means for effecting a good seal between cooperating coupling members, such as between the coupling members used to join hose sections together.

Another object is to improve the sealing between cooperating coupling members with a minimum of change being effected to the coupling members themselves.

Another object is to extend the life of members used for coupling hose sections together and for coupling a hose section to a faucet.

Another object is to effect a good seal between conduit members without requiring any tools or the like.

Another object is to minimize leakages which occur where hoses and other like members are coupled together to an adjacent member.

Another object is to provide a resilient sealing member for use in couplings and the like which has a longer resilient life expectancy that sealing members used heretofor.

Another object is to provide inexpensive means to improve the seal between hose couplings and the like which are adaptable to being packaged in a convenient way for sale and handling.

Another object is to provide means capable of effecting a seal between coupling members even though one or both of the coupling members are somewhat damaged.

Another object is to provide means which, in addition to sealing, protect the interior surfaces of coupling members from deteriorating effects thereon caused by the fluid or other material passing through the coupling.

These and other objects of the present invention will become apparent hereinafter.

Several different embodiments of the present construction are shown and described in the application, including embodiments wherein two sections of hose are to be connected together, wherein a section of hose is to be connected to a water tap or the like, and wherein a portion of a flexible hose itself is extended through and beyond one of two coupling members to be joined for engagement with a valve seat located in the other member when the members are connected together. In the drawings which follow, like numerals refer to like parts wherever they occur, and in the drawings:

FIG. 1 is a side elevational view showing end portions of two lengths of garden hose connected together by coupling means constructed according to the present invention;

FIG. 2 is a fragmentary cross-sectional view taken on line 2—2 of FIG. 1;

FIG. 3 is an exploded view similar to FIG. 1, but showing a modified form of the subject coupling means;

FIG. 4 is an enlarged fragmentary cross-sectional view taken on line 4—4 of FIG. 3, but with coupling means shown in coupled condition;

FIG. 5 is an enlarged cross-sectional view similar to FIGS. 2 and 4, but showing another form of the subject invention;

FIG. 6 is an enlarged cross-sectional view showing another modified form of the subject invention wherein a hose is coupled to a faucet; and, FIG. 7 is an enlarged side elevational view showing a modified form of the sealing member of FIGS. 1 and 2.

Referring to the drawings in detail, FIG. 1 shows coupling means 10 for connecting ends of two lengths of hose 12 and 14. The coupling means include male and female coupling members 16 and 18 which are threaded at 20 and 22 respectively and which are connected together having sealing means therebetween constructed according to the teachings of the present invention. The coupling members 16 and 18 may be of known construction which is an important advantage of the present invention. Also, as shown in FIG. 1, a portion of the threads on the male and female coupling members may remain unengaged even after a leak proof seal has been effected. This has advantages as will be explained and obviates the necessity to use wrenches or other tools when connecting the members even after repeated usage. In fact with the present construction hand tightening is usually all that is necessary for reasons which will become apparent.

Referring to FIG. 2 for a more detailed view of a preferred form of the subject coupling means, the male coupling member 16 is shown connected to the end of the hose 12 by means of members 24 and 26, the member 24 extending into the end of the hose 12 and the member 26 including a plurality of tabs which are pressed into engagement with the hose to complete the connection. The opposite end of the male member 16 from the hose has the external threads 20 which cooperate with the internal threads 22 on the female coupling member 18, and the male member 16 terminates in a free end surface 28. In addition the male member 16, which may be formed of brass or some other like material, has an annular inwardly extending shoulder or flange 30 which forms a seat for the subject coupling means. The shoulder 30 is formed on a portion of the male member 16 which extends between the threaded portion 20 and the portion 24, which is the portion that extends into the end of the hose 12. Note also that the shoulder 30 extends inwardly further than the end surface 28 of the member 16. This is important because the shoulder 30 in the preferred embodiment is one of two surfaces which function in providing a seal between the male and female members. Furthermore, the surface 30 is available in some known coupling constructions, but, so far as known, not used in any known prior art construction as a means to effect a sealed connection between coupling members.

The female coupling member 18 is attached to the end of the hose 14 in a manner similar to the connection of the male coupling member 16 using securing members 32 and 34. Other means for attaching the coupling members to the hose such as by crimping can also be used, and the means chosen for this purpose are not at the heart of the present invention. The female member 18 has the internal threads 22 which extend inwardly from a free end surface 36 thereof, and another annular inwardly extending shoulder or flange 38 is formed in the female member 18 at the opposite end of the threads 22 from the end surface 36. The shoulder 38 forms a second sealing surface for the subject coupling 10 and is also important to the invention. When the male and female members 16 and 18 are threadedly engaged with each other, the shoulders 30 and 38 are located at opposite ends of the threads 20 and 22 and are located in spaced and opposed relation to each other.

Referring again to FIG. 2, there is shown as part of the coupling 10 an elongated resilient tubular member 40. The member 40 has an outside diameter that is approximately the same size as the inside diameter of the end surface or flange 28 on the male member 16, and the member 40 has opposite end surfaces 42 and 44 which are spaced apart a sufficient distance so that they simulaneously and sealingly engage the shoulders or ledges 30 and 38 respectively when the threaded portions 20 and 22 are engaged and tightened on each other as shown. The member 40 is preferably made of a resilient substance such as a relatively resilient plastic so that when the male and female members are tightened on each other, the member 40 will to some extent be compressed lengthwise into sealing engagement with the shoulders 30 and 38. By being made of a resilient material, the member 40 can relatively easily be forced into the male member even if the end surface 28 is damaged or somewhat non-round. Another advantage is that if the end surfaces 42 and 44 become damaged or scuffed it is relatively easy to trim them to restore a good leak proof engagement between them and the shoulders 30 and 38. It is also possible that when the member 40 is compressed axially that it will bulge outwardly to some extent, and this is usually not objectionable if it is not excessive. Furthermore, when water or some other substance is flowing through the coupling 10, the pressure may tend to expand the member outwardly to some extent, and this likewise is not usually objectionable. To use the tubular member 40 it is preferably, but not necessarily, first inserted into the open end of the male member 16 and pushed far enough for one of its end surfaces, the surface 42, to abut the shoulder 30. At this point and because of the length of member 40, the opposite end surface 44 extends beyond the end surface 28 of the male member 16. Thereafter, when the threaded members 16 and 18 are joined by their respective threaded portions 20 and 22 and are threaded together, the end surfaces 42 and 44 of the member 40 will abut and resiliently engage the respective surfaces 30 and 38. Thereafter, any additional turning force on the members 16 and 18 will sealably compress the member 40 against the shoulders 30 and 38. This results in a seal being simultaneously effected between each opposite end surface of member 40 and the respective shoulders 30 and 38. The construction and procedure just described should be contrasted with the more conventional construction wherein a seal is effected by compressing a relatively thin rubber or rubber-like washer that is positioned between the narrow, and usually relatively sharp, edges of the end surface 28 on the male member 16 and the surface or shoulder 38. The disadvantages of this prior construction are set forth hereinabove.

Another embodiment of the present invention is illustrated in FIGS. 3 and 4, FIG. 3 being an exploded view showing a coupling formed by male and female threaded members 16 and 18 similar to those shown in FIGS. 1 and 2. In the embodiment of FIGS. 3 and 4 a modified form of insert or sealing member 50 is used. The member 50 is tubular in shape and includes a hard central body portion 52 of metal or like material with an integral annular flange 54 on one end. The member 50 also has resilient members or layers 56 and 58 of rubber or rubber-like substances attached as by gluing or otherwise to the opposite ends thereof. The resilient member 56 is on one end of the central body portion 52 and is the end that is positioned extending into the male coupling member 16 for engagement with the shoulder 30, and the resilient member 58 is located on the flange 54 opposite the body 52 and engages the shoulder 38 when the coupling members are assembled as described. The flange 54 and the resilient member 58 are able to have a larger diameter than the resilient member 56 because they are positioned in the female member 18 rather than in the male member 16, although the member 50 could be constructed having uniform inside and outside diameters if desired. Also, the member 50 can be constructed as one piece with or without an enlarged or flanged end. In the modified construction as shown in the drawing, the central body portion 52 may be constructed as indicated of a relatively rigid material, and in some cases this may be an advantage to provide backing and support for the resilient end pieces 56 and 58. However, in all constructions the resilient end surfaces abut relatively flat surfaces on the coupling members and are therefore not likely to be damaged by repeated use. Again, it is important to have the parts made as accurately as possible with cost in mind so that they will cooperate with the parts on the coupling members to which they are applied. Also the overall length of the member 50 and thickness of the layers 56 and 58 should be such that the layers 56 and 58 will engage the shoulders 30 and 38 respectively, while enabling the threads on the members to adequately mate. The main advantage of the embodiment 50 over the preferred embodiment 40 is that it is a more durable construction although less resilient. The embodiment 50 is also more expensive to make, and the resilient pads 56 and 58 may not be as easy to sealably compress against the shoulders and may have less resilient life.

A third embodiment of the present invention is shown in FIG. 5. This embodiment requires use of a special male coupling member 16A which is applied to the hose end by being pressed thereon to a position in which the hose end 60 extends completely through the coupling member 16A and from the free end 66 thereof. This completely eliminates the need for a shoulder such as the shoulder 30 shown in FIGS. 2 and 4. The female coupling member 18 may then be of the same construction as already described. The amount that the free end of the hose 12 extends from the end 66 of the male coupling 16A is approximately the same as the amount that the members 40 and 50 extend therefrom when installed. This is so that when the female member 18 is threadedly attached to the male member 16A, the shoulder 38 will sealably abut the end surface 68 of the hose. This construction has advantages in reducing the number of parts, and the extended end of the hose may also help to prevent damage to the male fitting 16A when it is bumped against something. However, the construction has disadvantages as well, including requiring special equipment to install the male fitting on the hose, and also it may be difficult to repair the device if the projecting end of the hose is damaged.

Another embodiment of the invention is shown in FIG. 6, wherein the hose length 14, with the female coupling member 18, is threadedly attached to an externally threaded portion of an adapter 70 which in turn is threadedly attached to a fixed pipe end or faucet 72. In order to use the principles of the present invention when attaching a hose to a faucet, it may be necessary to attach the separate adapter member 70 to the faucet in order to establish shoulder 74 corresponding to the shoulder 30 in the constructions already described. The shoulder 74 is formed on the adapter 70 at a distance from free end 76 of the adapter which is a distance that corresponds to the distance between the end surface 28 on male member 16 (FIG. 2) and the shoulder or flange 30.

In operation the female end of the adapter 70 is threaded onto the threaded end of the faucet 72, and this connection can be made relatively tight, using a wrench if desired, so that the adapter 70 will not come loose when the hose is attached or detached, and therefore the adapter becomes more or less a permanent part of the faucet 72. Because of this, it may be desirable to use a sealing compound on the threads when making this connection. When this is done the adapter becomes the male connection of the coupling means, and a member similar to the member 40 (or 50) is inserted into the end of the adapter 70 until one of its opposite end surfaces abuts the shoulder 74. The female coupling 18 is then cooperatively engaged with the threads on the male end of the adapter 70 and preferably turned by hand until the resilient member 40 is resiliently compressed into abutment between the shoulders 38 and 74 to complete the connection. The device is now ready for use. Furthermore, if the resilient tubular member in this construction is lost, the adapter 70 may be used with a conventional washer until a replacement tubular member can be obtained.

An optional feature applicable for use with the member 40 is disclosed in FIG. 7 and includes providing one or more enlargements or outwardly extending projections 80 at one or more intermediate locations along the outer surface of the member 40. The enlargement or enlargements 80 are preferably integral with the member 40 and extend outwardly far enough to engage the inner edge of the end surface 28 of the male member into which it is installed. This is done to help to hold the member 40 in place in the member 16 so that it will not easily come out and be lost or be flushed out when the water is turned on at times when the member is positioned in the male member but the coupling members are not joined. The projections 80 may also be such that the member 40 snaps into position when it is installed. Furthermore, as already indicated the member 40 may slightly enlarge after continuous use due to the water pressure, and this may help to keep the member 40 from accidentally falling out. In addition, although not shown, the optional feature including projections 80 may be similarly applied for use with member 50.

Thus there has been shown and described several embodiments of improved coupling means used when connecting hose fittings and other like members together, which coupling means fulfill all of the objects and advantages sought therefor. It will be apparent, however, that many changes, variations, modifications and other uses and applications of the subject coupling means are possible, and all such changes, variations, modifications, and other uses and applications which do not depart from the spirit and scope of the invention are deemed covered by the invention which is limited only by the claims which follow.

What is claimed is:

1. Improved means for the leak-proof coupling together of male and female threaded members including a tubular male threaded member having a passage therethrough, a surface on one end of said member and external threads thereon, said end surface on the male member extending inwardly to define an opening into the male member that is smaller in diameter than the diameter of the passage therethrough, a tubular female threaded member having internal threads adapted to be cooperatively engageable with the external threads on the male member and an edge surface on one end thereof, means forming an annular flange on the male threaded member extending radially into the passage therein at a location spaced from the end surface, means forming an annular inwardly extending ledge on the female member at a location spaced from the end edge surface thereon, said flange and said ledge extending radially inwardly to define openings in the respective male and female members that are smaller in diameter than the diameter of the opening into the male member defined by the end surface thereon, said flange and said ledge being located in spaced and opposed substantially parallel relationship to each other on opposite sides of the threads on the male and female members when the threads on the respective members are cooperatively engaged, said means comprising a resilient tubular member having an outer side wall at least a portion of which is of approximately the same diameter as the diameter of the opening into the male member defined by the end surface thereon, said resilient member being insertable to extend through the opening defined by the end surface on said male member and into the passage therein with the end surface on said male member acting as a guide during insertion and engaging the outer side wall of the resilient member to provide support therefor, at least a portion of the resilient member inserted into the passage in said male member having a smaller outer diameter than the diameter of the passage in said male member so as to form an air space around the resilient member in the passage in the male member, and said resilient member having spaced apart substantially parallel, radial, end surfaces thereon which are spaced apart a distance at least equal to the length of the threads on one of said members and sufficiently to simultaneously resiliently sealably engage the annular flange and the annular ledge when the male member is partly threaded into the female member, and sufficiently so that any further threading of the male member into the female member thereafter causes said resilient member to be axially compressed to improve the sealed condition between the resilient member and the male and female members.

2. The improved means defined in claim 1 wherein the annular flange is located adjacent to one end of the threads on the male member and the annular ledge is located adjacent to one end of the threads on the female member.

3. The improved means defined in claim 1 including means on said male member adjacent to the opposite end of the threads from the end surface to sealably connect to a conduit, and means on said female member adjacent to the opposite end of the threads thereon from the edge surface to sealably connect to a second conduit.

4. The improved means defined in claim 1 wherein said resilient tubular member is formed of a plastic substance.

5. The improved means defined in claim 1 including means extending outwardly from the side wall of the resilient tubular member at an intermediate location therealong to engage the male member during insertion therein to prevent the resilient tubular member from undesirably being dislodged therefrom.

6. Improved means for the leak-proof coupling together of male and female threaded members including a tubular male member having a passage therethrough, an end surface on one end of said member and external threads thereon, said end surface on the male member extending radially inwardly to define an opening into the male member that is smaller in diameter than the diameter of the passage therethrough, a tubular female member having internal threads adapted to be cooperatively engageable with the external threads on the male member, an end edge surface on one end thereof and a passage therethrough, means forming an annular flange on the male member extending radially into the passage therein at a location spaced from the end surface, mean forming an annular inwardly extending ledge on the female member at a location spaced from the end edge thereon, said flange extending radially into the passage in said male member to define a port in the male member that is smaller in diameter than the diameter of the opening into the end of the male member, said flange and said ledge being located adjacent to the threads on the respective members and in spaced and opposed substantially parallel relationship to each other when the threads on the male and female members are cooperatively engaged, said means comprising a resilient tubular sealing member having opposed annular, substantially parallel, radial, end surfaces and a body portion extending therebetween, said body portion having an outer side wall portion with approximately the same diameter as the diameter of the opening into the male member defined by the end surface thereon and a length that is greater than the distance between said annular flange and the end surface on the male member, said sealing member being insertable through the opening into the male member into the passage therein with the end surface on the male member guiding the insertion and engaging the outer side wall of said sealing member to provide support therefor, at least a portion of the sealing member that is inserted into the passage in said male member having a smaller outer diameter than the diameter of the passage in said male member to form an air space around the outer side wall of the sealing member in the passage in said male member, the annular end surfaces on the tubular sealing member being spaced apart a distance at least equal to the length of the threads on one said members and sufficiently so that they simultaneously resiliently sealably engage the annular flange and the annular ledge when the female member is partly threaded onto the male member, and so that any further threading of the female member onto the male member thereafter causes said resilient member to be compressed lengthwise to improve the resilient sealable engagement between said spaced apart annular end surfaces and the annular flange and the annular ledge.

7. The improved means defined in claim 6 wherein the tubular sealing member has portions of different material hardness.

* * * * *